(12) United States Patent
Lindmark

(10) Patent No.: US 12,462,845 B2
(45) Date of Patent: Nov. 4, 2025

(54) GENERATING A THREE-DIMENSIONAL EFFECT OF A VIDEO STREAM

(71) Applicant: Google LLC, Mountain View, CA (US)

(72) Inventor: Stefan Lindmark, Östhammar (SE)

(73) Assignee: Google LLC, Mountain View, CA (US)

( * ) Notice: Subject to any disclaimer, the term of this patent is extended or adjusted under 35 U.S.C. 154(b) by 30 days.

(21) Appl. No.: 18/238,920

(22) Filed: Aug. 28, 2023

(65) Prior Publication Data

US 2025/0078870 A1 Mar. 6, 2025

(51) Int. Cl.
*G11B 27/02* (2006.01)
*G06T 15/20* (2011.01)
*G06T 19/00* (2011.01)
*G11B 27/031* (2006.01)

(52) U.S. Cl.
CPC ............ *G11B 27/02* (2013.01); *G06T 15/20* (2013.01); *G06T 19/006* (2013.01); *G11B 27/031* (2013.01)

(58) Field of Classification Search
None
See application file for complete search history.

(56) References Cited

U.S. PATENT DOCUMENTS

| | | | |
|---|---|---|---|
| 10,255,714 B2 * | 4/2019 | Mitchell | G06F 3/013 |
| 10,860,098 B1 * | 12/2020 | Stratton | G06V 40/193 |
| 11,562,153 B1 * | 1/2023 | Etwaru | G06F 40/58 |
| 11,948,263 B1 * | 4/2024 | Rudman | G06V 20/20 |
| 2015/0199005 A1 * | 7/2015 | Haddon | G06F 3/013 |
| | | | 345/163 |
| 2017/0068091 A1 * | 3/2017 | Greenberg | G02B 26/101 |
| 2020/0150428 A1 * | 5/2020 | Greenberg | G02B 26/101 |
| 2021/0400142 A1 * | 12/2021 | Jorasch | H04L 65/1069 |
| 2022/0101593 A1 * | 3/2022 | Rockel | A63F 13/655 |
| 2023/0093979 A1 * | 3/2023 | Stauber | G06F 3/011 |
| | | | 345/419 |
| 2023/0126108 A1 * | 4/2023 | Roper | H04N 7/147 |
| | | | 348/14.08 |
| 2023/0237192 A1 * | 7/2023 | Kahan | G06V 10/60 |
| | | | 726/1 |
| 2023/0319221 A1 * | 10/2023 | Doken | G06T 7/12 |
| 2023/0360177 A1 * | 11/2023 | Lee | G06N 3/045 |
| 2023/0360282 A1 * | 11/2023 | Blackburne | H04N 7/157 |
| 2024/0103615 A1 * | 3/2024 | Huergo Wagner | G06F 3/012 |
| 2024/0153205 A1 * | 5/2024 | Huergo Wagner | G06T 17/00 |
| 2024/0404177 A1 * | 12/2024 | Da Veiga | G06T 19/006 |
| 2024/0404227 A1 * | 12/2024 | Chiu | H04L 65/1089 |

* cited by examiner

*Primary Examiner* — Gelek W Topgyal
(74) *Attorney, Agent, or Firm* — Lowenstein Sandler LLP

(57) ABSTRACT

Systems and methods for generating a 3D effect for a video stream are provided. A first video stream from a first client device of a first participant of a virtual meeting and a second video stream from a second client device of a second participant of the virtual meeting is identified. A background and a foreground layer of the first video stream is determined. A first and a second eye position of the second participant of the second video stream are determined. A presentation position of the background layer relative to the foreground layer is determined based on movement between the first and the second eye position of the second participant of the second video stream. A UI presenting the first video stream reflecting the determined presentation position of the background layer relative to the foreground layer is provided for display on the second client device.

20 Claims, 7 Drawing Sheets

400

402 Identify a first video stream from a first client device of a first participant of a video conference and a second video stream from a second client device of a second participant of the video conference

404 Determine a background layer and a foreground layer of a first frame of the first video stream, where the foreground layer of the first frame of the first video stream includes a rendering of the first participant

406 Determine a first eye position of the second participant within a first frame of the second video stream and a second eye position of the second participant within a second frame of the second video stream

408 Determine a presentation position of the background layer relative to the foreground layer for a second frame of the first video stream based on movement between the first eye position of the second participant within the first frame and the second eye position of the second participant within the second frame of the second video stream

410 Provide, for display on the second client device, a user interface (UI) presenting the second frame of the first video stream reflecting the determined presentation position of the background layer relative to the foreground layer.

FIG. 4

GENERATING A THREE-DIMENSIONAL EFFECT OF A VIDEO STREAM

TECHNICAL FIELD

Aspects and implementations of the present disclosure relate to generating a three-dimensional (3D) effect for a video stream.

BACKGROUND

Virtual meetings can take place between multiple participants via a virtual meeting platform. A virtual meeting platform includes tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. To this end, the virtual meeting platform can provide a user interface to display the video streams of participating client devices.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes generating a three-dimensional (3D) effect for a video stream. In an implementation, the method includes identifying a first video stream from a first client device of a first participant of a virtual meeting and a second video stream from a second client device of a second participant of the virtual meeting. The method further includes determining a background layer and a foreground layer of a first frame of the first video stream, wherein the foreground layer of the first frame of the first video stream includes a rendering of the first participant. The method further includes determining a first eye position of the second participant within a first frame of the second video stream and a second eye position of the second participant within a second frame of the second video stream. The method further includes determining a presentation position of the background layer relative to the foreground layer for a second frame of the first video stream based on movement between the first eye position of the second participant within the first frame and the second eye position of the second participant within the second frame of the second video stream. The method further includes providing, for display on the second client device, a user interface (UI) presenting the second frame of the first video stream reflecting the determined presentation position of the background layer relative to the foreground layer.

In some embodiments, to determine the first eye position of the second participant within the first frame of the second video stream and the second eye position of the second participant within the second frame of the second video stream, the method includes providing the first and the second frame of the second video stream as input to a machine learning model. The machine learning model is trained to predict, based on a given frame, one or more regions within the given frame that each represent eye features. The method further includes obtaining one or more outputs from the machine learning model, wherein the one or more outputs includes one or more regions within the first and the second frame of the second video stream, each indicating eye features within the respective frame. The method further includes determining the first eye position and the second eye position based on the one or more regions indicating eye features within the respective frame.

In some embodiments, to determine the first eye position and the second eye position, the method includes determining an average horizontal position, within the respective frame, of the one or more regions indicating eye features.

In some embodiments, the first eye position and the second eye position are determined relative to a field of view (FOV) of a device capturing video signals associated with the second video stream.

In some embodiments, to determine the background layer and the foreground layer of the first frame of the first video stream, the method further includes providing the first frame of the first video stream as input to a machine learning model. The machine learning model is trained to predict, based on a given frame, segmentation labels for the given frame that represent foreground and background regions of the given frame. The method further includes obtaining outputs from the machine learning model. The outputs include one or more background regions and one or more foreground regions. The method further includes combining the one or more background regions to obtain the background layer and combining the one or more foreground regions to obtain the foreground layer.

In some embodiments, to determine the presentation position of the background layer relative to the foreground layer for the second frame of the first video stream based on the movement between the first eye position of the second participant within the first frame and the second eye position of the second participant within the second frame of the second video stream, the method further includes determining a pixel difference between the first eye position of the second participant within the first frame of the second video stream and the second eye position of the second participant within the second frame of the second video stream. The method further includes modifying the presentation position of the background layer in a same direction as the movement between the first eye position and the second eye position. An amount of presentation position modification is proportional to the pixel difference between the first eye position and the second eye position.

In some embodiments, the amount of presentation position modification is scaled according to a depth distance between the foreground layer and the background layer. In some embodiments, the depth distance is an assigned indicator of depth between the background layer and the foreground layer of the first video stream.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 4 depicts a flow diagram of a method for generating a three-dimensional effect for a video stream, in accordance with aspects and implementations of the present disclosure.

DETAILED DESCRIPTION

Figure 1:
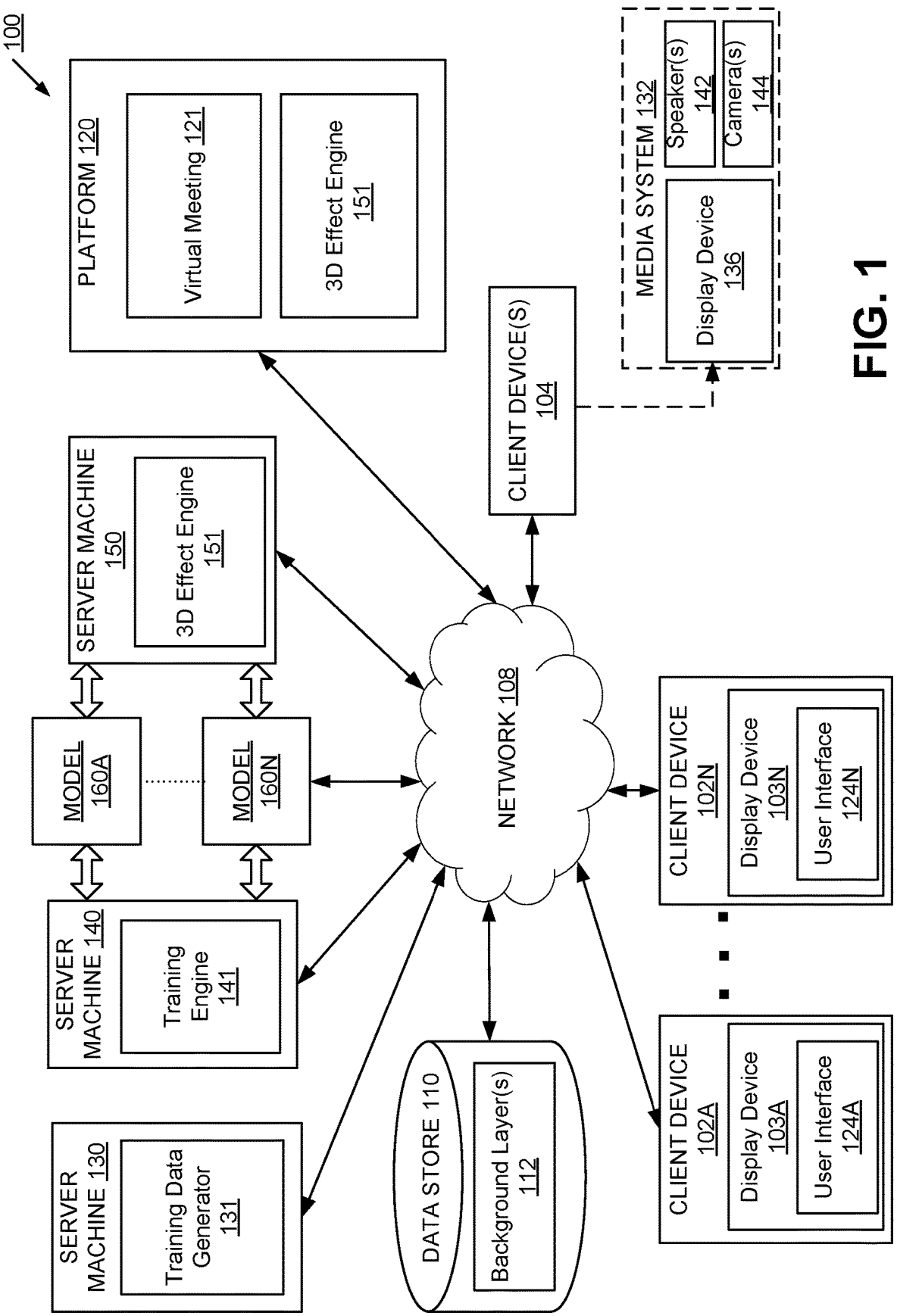
FIG. 1 illustrates an example system architecture capable of generating a three-dimensional (3D) effect for a video stream, in accordance with aspects and implementations of the present disclosure.

Aspects of the present disclosure relate to generating a three-dimensional (3D) effect for a video stream. A virtual meeting platform can enable video-based conferences between multiple participants via respective client devices that are connected over a network and share each other's audio (e.g., voice of a user recorded via a microphone of a client device) and/or video streams (e.g., a video captured by a camera of a client device) during a virtual meeting. In some instances, a virtual meeting platform can enable a significant number of client devices (e.g., up to one hundred or more client devices) to be connected via the virtual meeting. A virtual meeting (e.g., video conference) can refer to a virtual meeting during which a client device connected to the virtual meeting platform captures and transmits image data (e.g., video data collected by a camera of the client device) and/or audio data (e.g., collected by a microphone of the client device) to other client devices connected to the platform. The image data can, in some instances, depict a participant or a group of participants that are participating in the virtual meeting. The audio data can include, in some instances, an audio recording of audio provided by the participant or group of participant during the virtual meeting.

A participant of a virtual meeting can speak (e.g., present on a topic) to the other participants of the virtual meeting. The virtual meeting platforms can provide a user interface (UI) (e.g., video conference UI) to each client device connected to the virtual meeting. The UI displays the video streams from the client devices over the network in a set of regions in the UI. For example, the video stream of a participant who is speaking to the other participants in the virtual meeting can be displayed in a designated, often larger, region of the UI of the virtual meeting platform, and other participants who are not speaking can be displayed in other, often smaller, regions.

Virtual meetings can facilitate real-time communication and collaboration among geographically diverse participants. Virtual meeting platforms can offer many features to help enhance the virtual meeting service. One such service can include enhancing a conventional two-dimensional (2D) video stream by rendering at least some visual objects of the video stream in a manner such that the visual objects are perceived by the viewing user in three dimensions (e.g., the three-dimensional (3D) effect). The 3D effect can refer to the rending of an image or video in a manner that creates a perception of a third dimension, often depth, for the viewing user.

To create the 3D effect, some conventional systems can combine sophisticated 3D hardware with 3D imaging software to provide video with a 3D effect. However, existing 3D hardware is not integrated in virtual meeting platforms at least because implementing such 3D hardware is incredibly cost-prohibitive (e.g., monetary cost, network bandwidth cost, etc.). For example, the 3D hardware can include custom display systems, infrared light emitters, multiple high-resolution cameras to capture different angles, depth sensors to capture a physical space of a scene, and/or other hardware and software that determines placement of objects within a physical space. The resulting captured data can be displayed on a specialized, multi-layer display to present a high-fidelity 3D representation of the scene. Such an implementation can utilize a vast amount of data to generate the 3D representation. For example, the system can capture high-resolution video data from multiple angles, depth information, data associated with a position of a participant (e.g., eye position), and other data to render a 3D representation of a participant. Transmitting and receiving such data to facilitate the 3D effect can consume a large amount of network bandwidth and processing resources, thereby impacting an overall performance of the system.

Aspects of the disclosure address the above-mentioned challenges and other challenges of existing technology by providing a relatively low-cost technique (e.g., monetary and computer resource cost) to generate a 3D effect for video streams, such as video streams of virtual meeting system. As noted above, a video stream of a participant who is speaking (e.g., speaking participant) to the other participants in the virtual meeting can be displayed in a designated, often larger, region of the UI of the virtual meeting platform, and other participants (e.g., viewing participants) who are not speaking can be displayed in other, often smaller, regions. The video stream corresponding to a viewing participant (also referred to as "viewer" herein) can be received by the virtual meeting system. Frames of the video stream corresponding to the viewing participant can be divided into multiple layers, such as a background layer and a foreground layer. The foreground layer can include visual content, such as the participant, that appears in front of the other layers. The background layer can include visual content, such as a landscape or a wall, that appears behind other layers. The layers of the video frame can be combined to form a composite video frame. Using the foreground layers of sequential frames, the virtual meeting system can detect visual features (e.g., using a machine learning model) that indicate a change in the position of the eyes of the viewing participant. Based on the detected change, the virtual meeting system can modify the background layers of the video frames of the video stream of the speaking participant to correspond to the change in eye position of the viewing participant. The composite video stream including the modified background layers can be provided for presentation at the client device of the viewing user.

For example, the viewing participant can view a representation of the speaking participant via the UI of the virtual meeting. At a first point in time, the viewing participant's eyes and head are directly in front of the local camera of the client device of the viewing participant. At a second point in time, the viewing participant's head moves to the left, moving the viewing participant's eyes to the left. The change in the position of the eyes (e.g., and/or head position) of the viewing participant is detected by the virtual meeting system using a machine learning model. Responsive to detecting the change in the position of the eyes of the viewing participant, the virtual meeting system can modify the background layer of the video stream of the speaking participant to show additional background to the right of the speaking participant's head and less background to the left of the speaking participant's head—in amounts that are proportional to the change in eye position of the viewing participant. Portions of the background that were previously obscured by the speaking participant can become visible in the modified background layer. The modified background layer can be composited with the foreground layer that includes the representation of the speaking participant, and the composited video frame/video stream can be transmitted to the client device of the viewing participant for presentation of the UI. In some embodiments, the foreground layer can be composited with the background layer at any location within the composited frame, such as at a center location of the composited frame. Similarly, if the eye position of viewing participant moves upwards, the virtual meeting system can modify the background layer of the speaking participant to include additional background (visual objects) above the speaking participant's head, generate a composite video frame/video stream with the modified background layer, and transmit the composite video frame/video stream to the client device of the viewing user for presentation.

In some embodiments, the virtual meeting platform can use a machine learning model that is trained to predict regions within a video frame that represent ocular features or eye features. Frames of the viewing participant's video stream can be provided as input to the trained machine learning model. Output of the machine learning model can predict an eye movement of the viewing participant's eyes within the viewing participant's video stream. For example, a first frame can be provided as input to the machine learning model and a first predicted eye position of the viewing participant's eyes can be obtained as output. A second frame (e.g., a subsequent frame) can be provided as input to the machine learning model and a second predicted eye position of the viewing participant's eyes can be obtained as output. Eye movement (e.g., change in eye position) between the first frame and second frame can be determined based on the difference between the second predicted eye position and the first predicted eye position. A background layer of the speaking participant's video stream can be modified relative to a foreground layer of the speaking participant's video stream based on the viewing participant's eye movement. The modified video stream having the 3D effect can be provided for display at the viewing participant's client device.

Aspects of the present disclosure provide technical advantages over previous solutions. The advantages of the disclosed technique can provide an additional functionality to the virtual meeting platform by intelligently generating a video stream having a 3D effect for the consumption by a viewing participant of a virtual meeting based on the detection of eye movement of the viewing participant. The techniques described herein can also result in more efficient use of computer resources, such as processing and memory resources, by providing a video stream with a 3D effect by utilizing a lower amount of computer resources and fewer components of 3D hardware than conventional 3D video systems.

FIG. 1 illustrates an example system architecture 100 capable of generating a three-dimensional (3D) effect for a video stream, in accordance with aspects and implementations of the present disclosure. The system architecture 100 (also referred to as "system" herein) includes client devices 102A-N, one or more client devices 104, a data store 110, a platform 120, and a server 130, each connected to a network 108.

In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video stream data, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments, data store 110 can be some other type of persistent storage such as an object-oriented database, a relational database, and so forth, that can be hosted by platform 120 or one or more different machines (e.g., the server 130) coupled to the platform 120 via network 108. In some implementations, the data store 110 can store portions of audio and video streams received from the client devices 102A-102N for the platform 120. Moreover, the data store 110 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents can be shared with users of the client devices 102A-102N and/or concurrently editable by the users.

In some implementations, the data store 110 can store background layer(s) 112 of video streams received from client devices 102A-102N. Background layer(s) 112 can generally refer to an underlying scene or images that relatively static and serve as a backdrop for a video stream. For example, a video stream can include a rendering of the participant's background that displays the participant's surroundings such as visual background elements the compose the background layer 112. In some embodiments, the background layer(s) 112 can be separated from a corresponding foreground layer of a video stream and stored in the data store 110. In some embodiments, the background layer(s) can be a virtual background where a foreground layer of a video stream is to be overlaid or composited on top of the virtual background. A foreground layer can represent moving elements that appear on top of a background layer in a video stream. For example, a foreground layer can include a rendering of a participant of a virtual meeting.

In some embodiments, platform 120 can enable users of client devices 102A-102N and/or client device(s) 104 to connect with each other via a virtual meeting (e.g., a virtual meeting 121). A virtual meeting refers to a real-time communication session such as a virtual meeting call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Platform 120 can allow a user to join and participate in a virtual meeting call with other users of the platform. Embodiments of the present disclosure can be implemented with any number of participants connecting via the virtual meeting (e.g., five hundred or more).

The client devices 102A-102N can each include computing devices such as personal computers (PCs), laptops, mobile phones, smart phones, tablet computers, netbook computers, network-connected televisions, etc. In some implementations, client devices 102A-102N can also be referred to as "user devices 102A-102N." Each client device 102A-102N can include an audiovisual component that can generate audio and video data to be streamed to platform 120. In some implementations, the audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 102A-102N. In some implementations, the audiovisual component can also include an image capture device (e.g., a camera) to capture images and generate video data (e.g., a video stream) of the captured data of the captured images.

In some embodiments, platform 120 is coupled, via network 108, with one or more client devices 104 that are each associated with a physical conference or meeting room. Client device(s) 104 can include or be coupled to a media system 132 that can include one or more display devices 136, one or more speakers 142 and one or more cameras 144. Display device 136 can be, for example, a smart display or a non-smart display (e.g., a display that is not itself configured to connect to network 108). Users that are physically present in the room can use media system 132 rather than their own devices (e.g., client devices 102A-102N) to participate in a virtual meeting, which can include other remote users. For example, the users in the room that participate in the virtual meeting can control the display device 136 to show a slide presentation or watch slide presentations of other participants. Sound and/or camera control can similarly be performed. Similar to client devices 102A-102N, client device(s) 104 can generate audio and video data to be streamed to platform 120 (e.g., using one or more microphones, speakers 142 and cameras 144).

Each client device 102A-102N or client device(s) 104 can include a web browser and/or a client application (e.g., a mobile application, a desktop application, etc.). In some implementations, the web browser and/or the client application can present, on a display device 103A-103N of client device 102A-102N, a user interface (UI) (e.g., a UI of the UIs 124A-124N) for users to access platform 120. For example, a user of client device 102A can join and participate in a virtual meeting via a UI 124A presented on the display device 103A by the web browser or client application. A user can also present a document to participants of the virtual meeting via each of the UIs 124A-124N. Each of the UIs 124A-124N can include multiple regions to present video streams corresponding to video streams of the client devices 102A-102N provided to the server 130 for the virtual meeting.

In some implementations, the system 100 can include a virtual meeting manager (not illustrated). The virtual meeting manager can be included in at least one of the sever machine 130, serve machine 140, server machine 150, platform 120, or client devices 102A-N. The virtual meeting manager is configured to manage a virtual meeting between multiple users of platform 120. In some implementations, the virtual meeting manager can provide the UIs 124A-124N to each client device to enable users to watch and listen to each other during a virtual meeting. The virtual meeting manager can also collect and provide data associated with the virtual meeting to each participant of the virtual meeting. In some implementations, the virtual meeting manager can provide the UIs 124A-124N for presentation by a client application (e.g., a mobile application, a desktop application, etc.). For example, the UIs 124A-124N can be displayed on a display device 103A-103N by a native application executing on the operating system of the client device 120A-120N or the client device(s) 104. The native application can be separate from a web browser. In some embodiments, the virtual meeting manager can determine video streams for presentation in the UI 124A-124N during a virtual meeting. Such a video stream can depict, for example, a user of the respective client device while the user is participating in the virtual meeting (e.g., speaking, presenting, listening to other participants, watching other participants, etc., at particular moments during the virtual meeting), a physical conference or meeting room (e.g., with one or more participants present), a document or media content (e.g., video content, one or more images, etc.) being presented during the virtual meeting, and the like.

As described previously, an audiovisual component of each client device can capture images and generate video data (e.g., a video stream) of the captured data of the captured images. In some implementations, the client devices 102A-102N and/or client device(s) 104 can transmit the generated video stream to virtual meeting manager. The audiovisual component of each client device can also capture an audio signal representing speech of a user and generate audio data (e.g., an audio file or audio stream) based on the captured audio signal. In some implementations, the client devices 102A-102N and/or client device(s) 104 can transmit the generated audio data to virtual meeting manager.

Training data generator 131 (e.g., residing at server machine 130) can generate training data to be used to train machine learning models 160A-N. Models 160A-N can include machine learning models used or otherwise accessible to three-dimensional (3D) effect engine 151. In some embodiments, training data generator 131 can generate the training data based on video frames of training videos and/or training images (e.g., stored at data store 110 or another data store connected to system 100 via network 108) and/or data associated with one or more client devices that accessed the training videos/images.

Server machine 140 can include a training engine 141. Training engine 141 can train machine learning models 160A-N using the training data from training data generator 131. In some embodiments, the machine learning models 160A-N can refer to model artifacts created by the training engine 141 using the training data that includes training inputs and corresponding target outputs (correct answers for respective training inputs). The training engine 141 can find patterns in the training data that map the training input to the target output (the answer to be predicted), and provide the machine learning models 160A-N that captures these patterns. The machine learning models 160A-N can be composed of, e.g., a single level of linear or non-linear operations (e.g., a Convolutional Neural Network (CNN) or other deep network, e.g., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning models 160A-N can refer to model artifacts that are created by training engine 141 using training data that includes training inputs. Training engine 141 can find patterns in the training data, identify clusters of data that correspond to the identified patterns, and provide the machine learning models 160A-N that captures these patterns. Machine learning models 160A-N can use one or more of clustering, supervised machine learning, semi-supervised machine learning, unsupervised machine learning, k-nearest neighbor algorithm (k-NN), linear regression, random forest, neural network (e.g., artificial neural network), a boosted decision forest, etc.

In some embodiments, machine learning models 160A-N can include a machine learning model 160A that is trained to predict, based on a given image or frame, background pixels and foreground pixels for the given frame based on learned patterns and features. In some embodiments, the machine learning model 160A can be trained to predict segmentation masks.

For example, the machine learning model 160A can be an image/frame segmentation model trained to predict segmentation masks that outline one or more regions corresponding to foreground objects in the image/frame. Segmentation masks indicate labels of pixels in an image/frame, the labels represent a region (e.g., a background region, a foreground region, etc.) to which the pixels correspond to. For example, the predicted segmentation mask can be represented as a two-dimensional data structure (e.g., an array) in which each element of the data structure corresponds to a pixel of a given frame. The value of each element of the data structure indicates class assigned to the respective pixel. For example, a value of 0 can indicate a background pixel and a value of 1 can indicate a foreground pixel.

In some embodiments, machine learning models 160A-N can include a machine learning model 160B that is trained to predict, based on a given image or frame, bounding boxes for the given frame that each indicate ocular features. 3D effect engine can leverage the predicted bounding boxes that indicate ocular features to determine an eye position within a frame of a video stream, as described below.

Server machine 150 can include 3D effect engine 151. 3D effect engine 151 can dynamically (e.g., for each frame of a video stream) modify a presentation position of a background layer of a video stream to produce a video stream with a modified background that provides a three-dimensional effect for a viewing participant (e.g., a participant of a virtual meeting 121) of the video stream. The presentation position of the background layer can refer to a location within a frame of a video at which the background layer is displayed. The presentation position can determine how the background layer is cropped within frames of the video. In an illustrative example, the video stream can be a video stream from a client device 102A of a first participant of a virtual meeting 121. A second participant (referred to as the "viewer" or "viewing participant" herein) of the virtual meeting 121 can view (e.g., via a client device 102B) the video stream of the first participant. The 3D effect engine 151 can analyze the viewing participant's video stream, based on the viewing participant's eye movement between frames, modify frames of the first participant's video stream to provide a video stream having a 3D effect for the viewing participant. A device (e.g., client device 102B) can capture video signals associated with the video stream of the viewing participant (e.g., the "viewer" of the video stream to be modified). 3D effect engine 151 can provide frames of the video stream of the viewing participant as input to an object detection machine learning model (e.g., machine learning model 160B) that is trained to predict bounding boxes that indicate ocular features within an image/frame. 3D effect engine 151 can obtain one or more outputs from the machine learning model 160B and utilize the one or more outputs to determine movement of eye position (e.g., a horizontal eye position) of the viewing participant between frames of the viewing participant's video stream. 3D effect engine 151 can modify a position of the background layer based on movement of the eye position of the second participant and present the video stream with the modified background layer to the viewing participant. For example, the viewing participant can move their head (and thus, their eye position) to the right relative to a field of view (FOV) of the client device 102B capturing the video stream of the viewer. In response to the movement, the 3D effect engine can provide a video stream with a modified background for presentation to the viewer in which a position of background layer is modified to the left. Thus, background elements previously not in frame or obscured by the rendering of the first participant can become visible to the viewing participant, thereby generating a video stream having a 3D effect for the viewing participant as it appears to the viewing participant that they are looking around the first participant.

In some embodiments, 3D effect engine 151 can leverage a segmentation machine learning model (e.g., machine learning model 160A) to determine background and foreground layers of the first participant's video stream. The foreground layer can include a rendering of the first participant while the background layer can include a rendering of the first participant's surroundings or a virtual background. The 3D effect engine 151 can provide frames of the first participant's video stream as input to a segmentation machine learning model (e.g., machine learning model 160A) and obtain the background layer and foreground layer as output.

It should be noted that although FIG. 1 illustrates 3D effect engine 151 as part of platform 120, in additional or alternative embodiments, 3D effect engine 151 can reside on one or more server machines that are remote from platform 120 (e.g., server machine 150, server machine 160). It should be noted that in some other implementations, the functions of server machines 130, 140, 150, and/or platform 120 can be provided by a fewer number of machines. For example, in some implementations, components and/or modules of any of server machines 130, 140, and 150 can be integrated into a single machine, while in other implementations components and/or modules of any of server machines 130, 140, and 150 can be integrated into multiple machines. In addition, in some implementations, components and/or modules of any of server machines 130, 140, and 150 can be integrated into platform 120. In general, functions described in implementations as being performed by platform 120 and/or any of server machines 130, 140, and 150 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of virtual meeting platform 120 and users of virtual meeting platform 120 participating in a virtual meeting, implementations can also be generally applied to any type of telephone call or conference call between users. Additionally, implementations of the disclosure are not limited to virtual meeting platforms that provide virtual meeting tools to users. For example, aspects and embodiments of the present disclosure can be applied to content sharing platforms that allow users to generate, share, view, and otherwise consume media items such as video streams and other video items.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user can be provided with controls allowing the user to make an election as to both if and when systems, programs, or features described herein can enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2A:
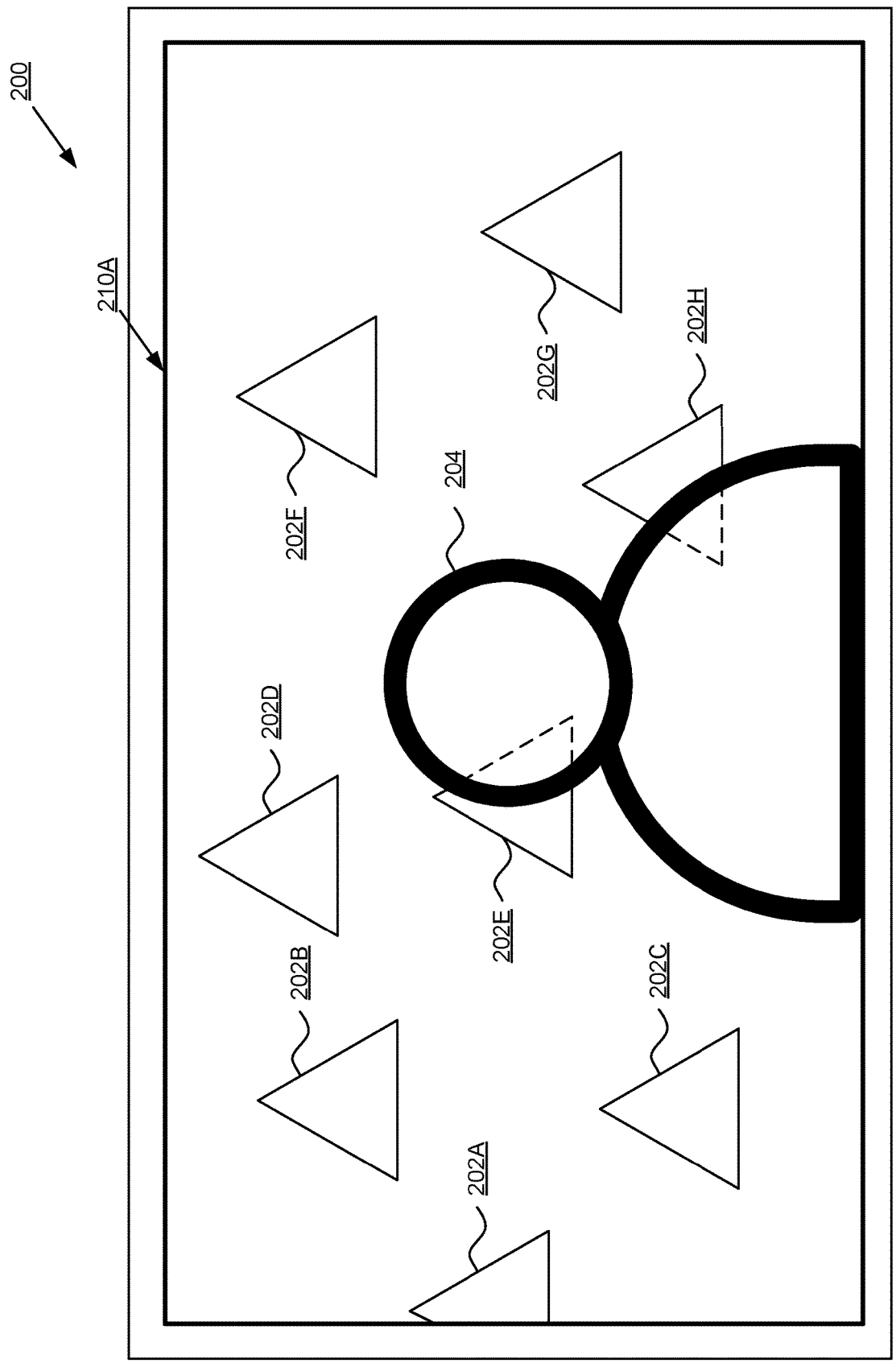
FIG. 2A illustrates an example user interface (UI) displaying a video stream of a participant of a virtual meeting before applying a modification to generate a video stream having a 3D effect, in accordance with aspects and implementations of the present disclosure.

FIG. 2A illustrates an example user interface (UI) 200 displaying a video stream of a participant 204 of a virtual meeting before applying a modification to generate video stream having a 3D effect, in accordance with some embodiments of the present disclosure. A modification to generate a 3D effect a process of manipulating or modifying elements a video stream to generate a sense of depth and immersion for a viewing participant of the video stream. Such an adjustment can create an impression that a foreground layer of a video stream appears to be closer to a viewing participant than the background layer, thereby generating a video stream having a 3D effect for the viewing participant. The UI 200 can be generated by one or more processing devices of the one or more servers 130-150. In some embodiments, the UI 200 can be generated for presentation at a client device (e.g., client devices 102A-102N and/or 104). In some implementations, the virtual meeting between multiple participants can be managed by a virtual meeting platform, such as platform 120 of FIG. 1. The platform 120 can provide the UI 200 to enable participants to join and participate in the virtual meeting.

UI 200 can include multiple regions, including a region 210A to display one or more video streams corresponding to video data captured and/or streamed by client devices, such as client devices 102A-102N of FIG. 1, associated with participants of the virtual meeting. In some embodiments, the region 210A can display a video stream of one participant of the virtual meeting. In an illustrative example, the region 210A can include a single region to display a video stream corresponding to the video data captured and/or stream by a client device associated with participant 204 of the virtual meeting. The illustrated single-region layout of UI 200 can be a "full-screen" view that focuses on the video stream of participant 204 while temporarily hiding video streams of other participants of the virtual meeting. The illustrated single-region layout of the UI 200 is used by way of example, and not by way of limitation, noting that other layouts of the UI 200 are considered herein. For example, the UI 200 can include multiple regions that each display a video stream corresponding to video data capture and/or streamed by client devices associated with multiple participants of the virtual meeting. The video streams of the multiple participants can be arranged in a grid pattern within the UI 200 wherein each participant's video stream is displayed in a separate rectangular region. In another example, the video stream of a participant that is actively speaking can be displayed prominently within the UI 200, while video streams of other participants can be displayed within the UI 200 in smaller regions (e.g., "thumbnail" regions). In some embodiments, the platform can associate each region with a video stream received from a client device. In some embodiments, this can be done automatically without any user input specifying which video stream(s) are to be displayed at the region 210A within the UI 200.

In some implementations, the UI 200 can also include an options region (not illustrated in FIG. 2A) for providing selectable options to adjust display settings (e.g., a size of each region, a number of regions, a selection of a video stream, etc.), invite additional users to participate, etc. In some implementations, the UI 200 can include a UI element (e.g., an icon) (not illustrated in FIG. 2A) that corresponds to a self-view indicator, which can indicate to a participant if the participant's video stream is displayed in a region in the UI.

In some embodiments, the user can interact with the UI 200 to cause a modification of a size or a position of video stream(s) displayed within the UI 200. For example, the user can use an input device (e.g., a keyboard, a touch screen etc.) or a cursor device (e.g., a mouse) associated with the client device to cause a modification of the size or the position of the video streams displayed within the UI 200. In some embodiments, the user can cause a modification of the position to a location outside of the UI 200. For example, in response to a user interaction (e.g., via a cursor, a touch screen etc.), the video stream of participant 204 can be detached from the UI 201 and moved to another display device. It is appreciated that the user can cause various modifications of video streams. For example, video streams can be resized, moved, zoomed in, cropped, transferred to another display device (e.g., another monitor), or otherwise adjusted to provide a preferred viewing environment. In another example, users can apply filters (e.g., sharpening filters, stylization filters, etc.), add contrast adjustments, or otherwise alter visual aesthetics of video streams according to a user's personal preference.

The video stream displayed within the region 210A can include a live video stream of the participant 204 connected to the virtual meeting. The video stream can be a live rendering of participant 204 including their facial features, body, and movements. The video stream can include a rendering of the participant's background that can provide the participant's surroundings for display such as visual background elements 202A-H. In some embodiments, the participant 204 can partially or completely obscure background elements 202A-H. For example, the participant 204 can be positioned to partially obscure background element 202E and 202H such that another participant (referred to as the "viewer" herein) of the virtual meeting viewing the video stream of participant 204 can only partially see background elements 202E and 202H. In some embodiments, background elements can be partially displayed within the region 210A. For example, background element 202A is only partially displayed within the region 210A as it is obscured by a boundary of the region 210A. In some embodiments, the boundary of the region 210A can be determined by a camera angle and field of view (FoV) of the client device capturing the video stream of participant 204. In some embodiments, the region 210A can be a cropping of the video stream captured by the client device such that the entirety of object 202A is captured within the FoV of the camera but not completely displayed within the region 210A.

In some implementations, a processing device (e.g., 3D effect engine 151) can cause the video stream to be separated into a background layer and foreground layer. The foreground layer can include a rendering of the participant 204 and objects in close proximity (e.g., within 2 feet) to the capture device. The background layer can include visual elements or scenery behind the participant 204, such as a room or a virtual background chosen by the participant 204. For example, the background layer can include background elements 202A-G that are part of the background layer. In some embodiments, the background layer can an image (e.g., a known, virtual background) assigned on behalf of the participant 204 or chosen by the participant 204 with the foreground layer composited on the top of the background layer. The image can be stored within a data store (e.g., data store 110). In some embodiments, a background image can be derived from the video stream itself with background regions that are obscured by the participant 204 generated (e.g., via a generative AI inpainting model).

In some embodiments, to separate the background and foreground layers, the processing device can segment the video stream using various computer vision techniques. Segmentation refers to the process of dividing an image into multiple regions or segments. For example, the video stream can be segmented into multiple background regions that, when combined, form the background layer; and into multiple foreground regions that, when combined, form the foreground layer. In some embodiments, the video stream can be segmented using a segmentation machine learning model that is trained to predict, based on a given image or frame, such as a frame of the video stream, background regions and foreground regions based on learned patterns and features. The segmentation machine learning model can be trained on historical data such as frames/images and labeled data indicating which regions (e.g., pixels) belong to a background region and which regions belong to a foreground region. Training data (historical data) can be labeled using ground truth data indicating which regions are part of the foreground and which regions are part of the background. The ground truth data can be established by human observers or through an automated tool. After training and deployment, the segmentation machine learning model can process frames of the video stream and predict background and/or foreground regions of the video stream based on learned patterns from the training data. The segmentation model can provide one or more foreground and background regions as output to the processing device.

In some embodiments, the processing device can combine the predict foreground regions obtain as output from the segmentation model to obtain the foreground layer and combine the predict background regions obtained as output form the segmentation model to obtain the background layer. In some embodiments, the background layer can be already known and stored as an image (e.g., a virtual background) within a data store (e.g., data store 110). The processing device can retrieve the background layer from the data store.

The processing device can modify a position of the background layer relative to the foreground layer based on eye movement of the viewer of the participant's 204 video stream, and present the modified video stream to the viewer to generate a video stream having a 3D effect for the viewer, as illustrated below with respect to FIGS. 3A-B and FIG. 2B. The 3D effect can be generated by modifying a position of the background and foreground layers within the UI 200, simulating a sense of depth for the viewer as the viewer appears to be looking around the participant 204.

Figure 3A:
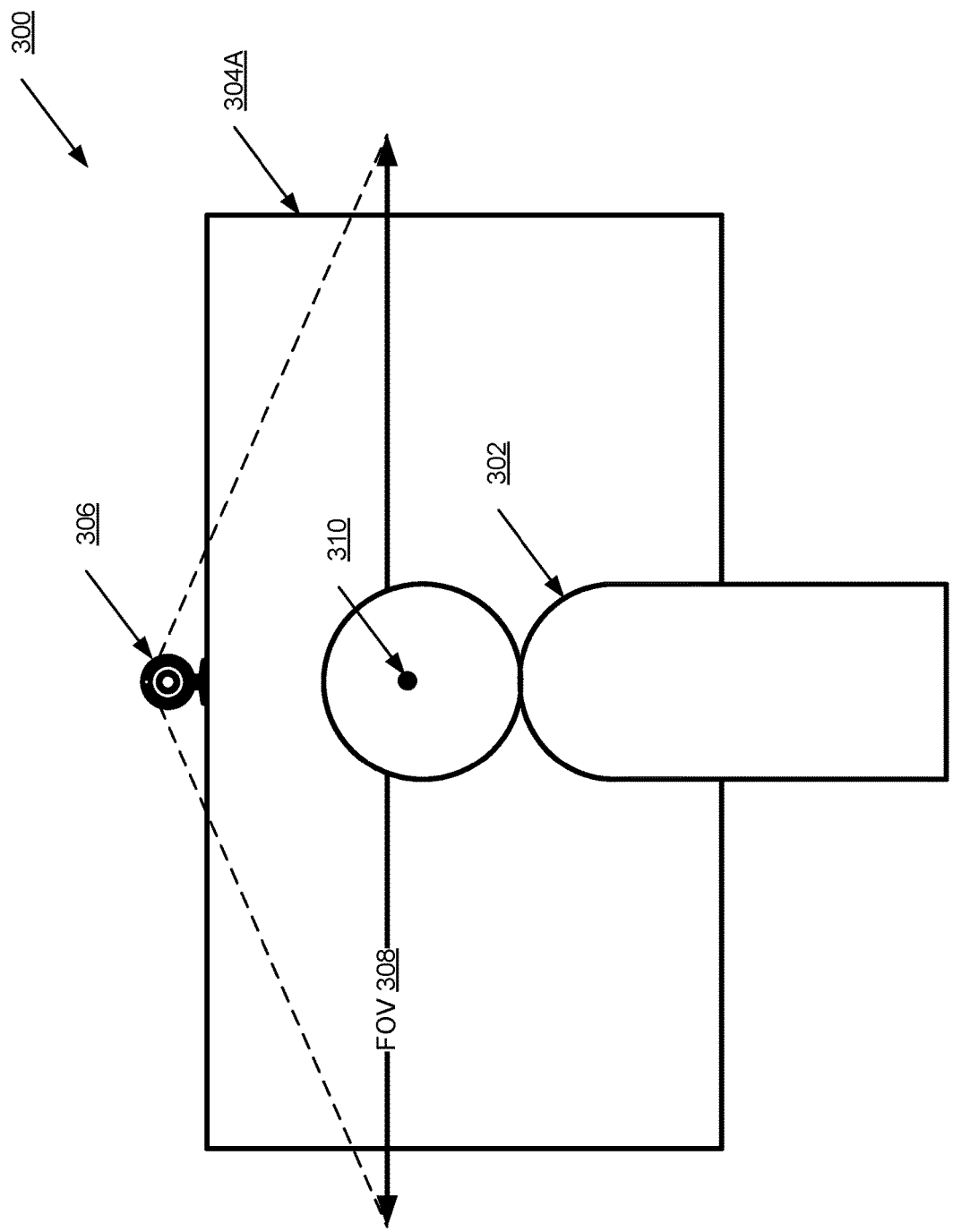
FIG. 3A is an illustration of a participant of a virtual meeting viewing a video stream of another participant of the virtual meeting, in accordance with aspects and implementations of the present disclosure.

FIG. 3A is an illustration 300 of a participant 302 (also referred to as "viewer" or "viewing participant" herein) of a virtual meeting viewing a video stream 304 of another participant of the virtual meeting, in accordance with aspects and implementations of the present disclosure. In some embodiments, the video stream 304A can correspond to the video stream presented within region 210A of FIG. 2A displaying the participant 204 of a virtual meeting. The illustration 300 includes a capture device 306 with a horizontal field of view (FOV) 308, capturing a live stream of the viewer 302. The horizontal FOV 308 refers to the angular extent that a scene is visible through the capture device 306 from left to right. For example, the capture device 306 can have a horizontal FOV 308 of 90 degrees, indicating that the capture device 306 can capture a scene that spans 90 degrees from a left edge of the frame to a right edge of the frame. A processing device (e.g., 3D effect engine 151) can determine a horizontal eye position 310 of the participant's 302 eyes in a frame captured by the capture device 306 relative to the FOV 308. The horizontal position 310 of the viewer's 302 eyes relative to the FOV 308 can refer to a center (or average) location of the viewer's 302 eyes along a horizontal axis of the frame. This measurement can be calculated in terms of a unit within the frame. For example, the capture device 306 can capture video at a video display resolution of 1920×1080, meaning that the captured frames have a width of 1920 pixels and a height of 1080 pixels. The horizontal pixels can be numbered from pixels 0 through to 1919 starting from the left of the frame. The horizontal eye position 310 of the viewer's 302 eyes can be determined to be at pixel 960 across the horizontal axis of the frame.

In some embodiments, the horizontal eye position 310 of the viewer's 302 eyes can be determined using an eye detection machine learning model that is trained to predict (e.g., identify and locate) ocular features within a frame of video item or an image. The eye detection model can be trained with a historical dataset of images and/or video frames. The historical dataset can be labeled with bonding boxes around ocular features contained with the images/video frames of the historical dataset. After training and deployment, the eye detection model can process unlabeled data, such as frames of a video item, and predict presence and location of ocular features within frames captured by the capture device 306. The eye detection model can identify one or more bounding boxes indicative of a location of one or more ocular features within a frame of the captured video stream.

The processing device can receive the bounding boxes indicative of ocular features as output from the eye detection model and determine a center location of the bounding boxes. For example, the processing device can receive a first bounding box centered on the horizontal pixel 860 and a second bounding box centered on the horizontal pixel 1060 of a frame captured by capture device 306. The processing device can average (e.g., (1060+860)/2=960) the horizontal pixel location of the first and second bounding box to determine pixel 960 is the horizontal eye position 310 of the viewer's 302 eyes.

Figure 2B:
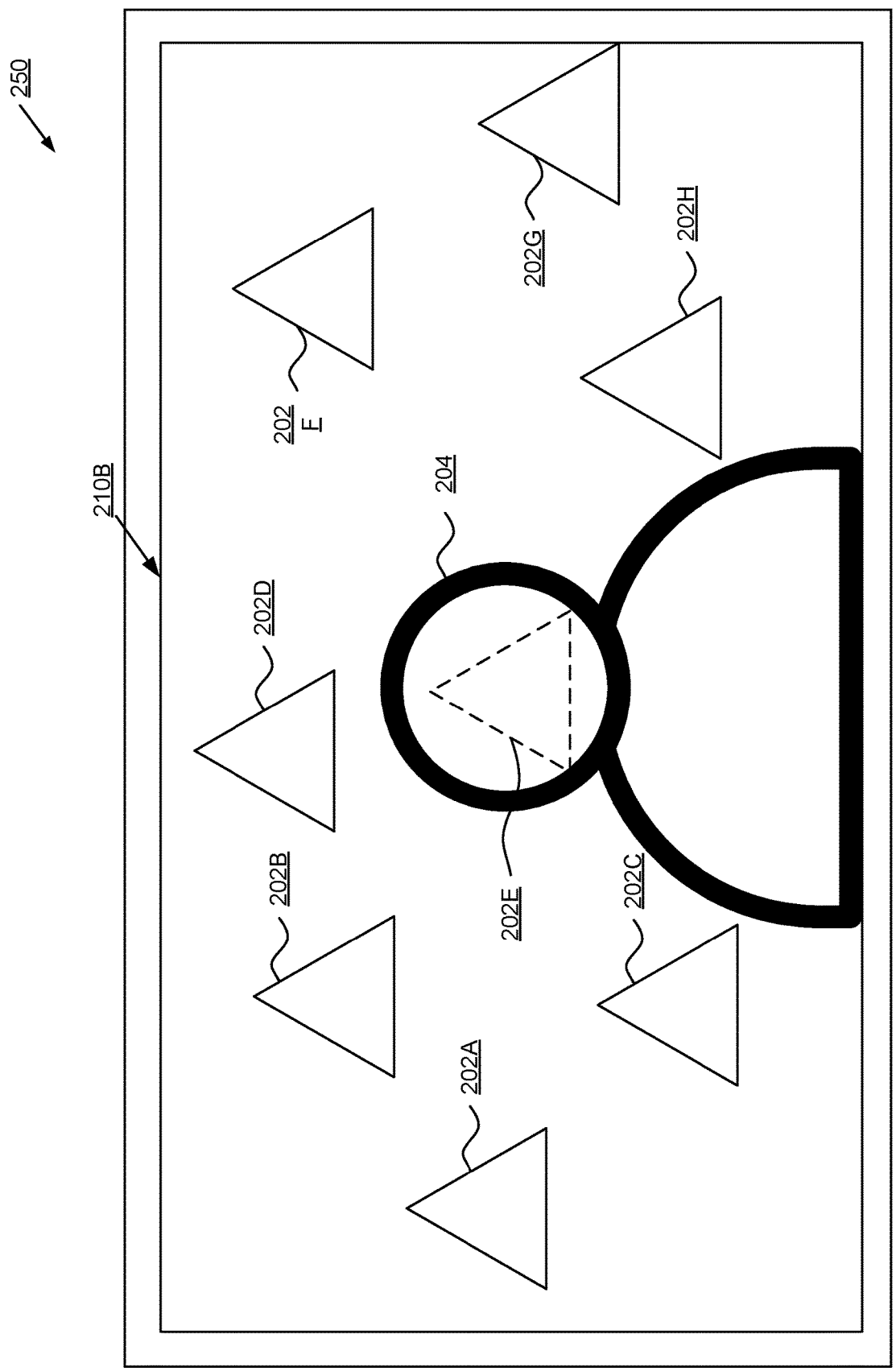
FIG. 2B illustrates an example UI displaying a video stream of a participant of a virtual meeting after applying a modification to generate a video stream having a 3D effect, in accordance with aspects and implementations of the present disclosure.
Figure 3B:
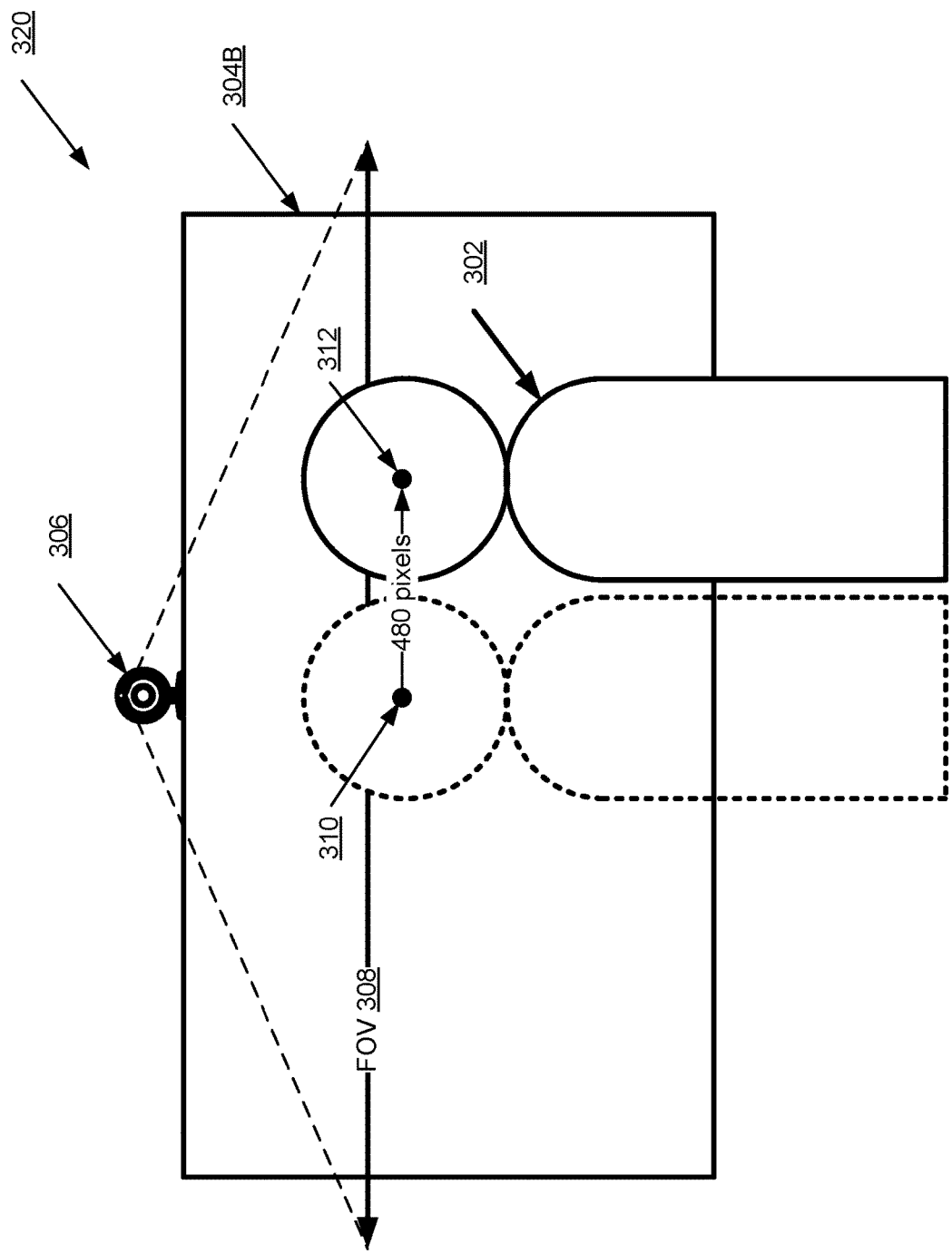
FIG. 3B is another illustration of a participant of a virtual meeting viewing a video stream of another participant of the virtual meeting, in accordance with aspects and implementations of the present disclosure.

FIG. 3B is another illustration 320 of a participant 302 (viewer 302) of a virtual meeting viewing a video stream 304B of another participant of the virtual meeting from a modified position, in accordance with aspects and implementations of the present disclosure. In some embodiments, the video stream 304B can correspond to a video stream presented with region 210B of FIG. 2B. Participants of a virtual meeting can move often within a frame due to natural body movement and other factors, thereby resulting in changing position of a participant's eyes throughout a virtual meeting. The viewer 302 can shift positions, adjust a seating arrangement, change posture, or otherwise change their arrangement within the FOV 308 of the capture device, thereby causing a change their position within a frame captured by the capture device 306.

For example, between frames captured by the capture device 306, the horizontal eye position 310 of the viewer's 302 eyes can be moved 480 pixels to the right to a horizontal eye position 312. In some embodiments, the horizontal eye position 312 can be determined by an eye detection machine learning model trained to predict ocular features, as described above with respect to FIG. 3A. A 3D effect can be generated for the viewer 302 by modifying a position of background and foreground layers of the video stream 304, simulating a sense of depth for the viewer 302 as the viewer 302 appears to be looking around the participant 204. In some embodiments, the video stream 304B can be a modified video stream presented within the UI 201B of FIG. 2B after movement of the viewer's 302 from horizontal eye position 310 to horizontal eye position 312.

Returning to FIG. 2A, a position of the background and foreground layers can be modified relative to each other based on an amount of viewer eye movement between frames. The degree of positional modification of the background and foreground layers can be determined based on a calculated layer adjustment level. The layer adjustment level can be expressed in the following equation, where $A_n$ represents the current layer adjustment level, $E_0$ represents and initial eye position (e.g., horizontal eye position 310), $E_n$ represents a current eye position (e.g., horizontal eye position 312), and D represents a depth factor between the background layer and a foreground layer.

$$A_n = (E_n - E_0) * D \qquad (1)$$

In some embodiments, the depth factor, D, of equation (1) can be defined by a developer or by a user parameter (e.g., via a client device) that scales the layer adjustment level, A, for a given frame, n. For example, a depth factor of one can result in a layer adjustment level of 480 pixels when the viewer moves 480 pixels when an eye position, $E_n$, is 480 pixels to the right of an initial eye position, $E_0$ ((1440−960) *1=480)). A presentation position of the background layer of a participant's 204 video stream presented within the region 210 of the UI 200 can be modified relative to the foreground layer of the participant's 204 video stream by the number of pixels specified by the layer adjustment level. A presentation position can refer to a spatial arrangement of the background layer within a frame of the video stream. As described above, the foreground layer includes a rendering of the participant 204 and the background layer includes a rendering of background elements 202A-H. As illustrated below with respect to FIG. 2B, a presentation position of the background elements 202A-H can be modified within the region 210 according to the viewer's eye movement (as expressed by equation (1)). For example, the frame presentation position of the background elements 202A-H can be modified 480 pixels to the left.

FIG. 2B illustrates an example user interface (UI) 250 displaying a video stream of a participant of a virtual meeting after applying a modification to generate a video stream having a 3D effect, in accordance with some embodiments of the present disclosure. The UI 250 can be generated one or more processing devices of the one or more servers 130-150. In some embodiments, the UI 250 can be generated for presentation at a client device (e.g., client devices 102A-102N and/or 104). In some implementations, the virtual meeting between multiple participants can be managed by a virtual meeting platform, such as platform 120 of FIG. 1. The platform 120 can provide the UI 200 to enable participants to join and participate in the virtual meeting.

After modifying a frame presentation position of background layer of the participant's 204 video stream, some background elements 204A-N can become visible, to the viewer, in the region 210 while other background elements can no longer be visible, to the viewer, within the region 210. For example, background element 202E is now completely obscured by the rendering of the participant 204 as the foreground layer is now composited on top of the region of the background layer that includes the background element 202E. The background element 202A that was initial partially obscured by the left-side boundary of the region 210 is now completely visible to the viewer. The background element 202H that was initially partially obscured by the rendering of the participant 204 is now completely visible the viewer. Modification of the presentation position of the background layer can cause the participant 204 to appear, to the viewer, to be placed further to the left, relative to the background elements 202A-H, thereby providing a video stream having a 3D effect for the viewer of the participant's 204 video stream. Such an effect can create an illusion of perceived depth for the viewer. For example, it can appear, to the viewer, that they are looking around the participant 204 for an unobscured view of the background object 202H.

In some embodiments, an adjustment can be applied to a foreground layer of the participant's 204 video stream in an opposite direction of the viewer's eye movement between frames to cause a presentation position of the foreground layer to be modified by a number of pixels specified by the layer adjustment level. For example, the presentation position of the foreground layer rendering the participant 204 can modified 480 pixels to the right to generate a video stream having a similar 3D effect that the foreground layer is closer to the viewer than the background layer. In some embodiments, a presentation position of the background layer and the foreground layer can be both be modified in opposite direction to generate a video stream having a 3D effect.

In some embodiments, the 3D effect can be continually (e.g., for each frame of the video stream) applied to the region 210 displaying the participant's video stream and displayed to the viewer in response to a change in viewer eye position to provide a video stream having a continuous 3D effect for the viewer.

FIG. 4 depicts a flow diagram of a method 400 for generating a three-dimensional (3D) effect of a video stream, in accordance with aspects and implementations of the present disclosure. Method 400 can be performed by processing logic that can include hardware (circuitry, dedicated logic, etc.), software (e.g., instructions run on a processing device), firmware, and/or a combination thereof. In one implementation, some or all the operations of method 400 can be performed by one or more components of system 100 of FIG. 1 (e.g., platform 120, servers 130-150, and/or 3D effect engine 151).

For simplicity of explanation, the method 400 of this disclosure is depicted and described as a series of acts. However, acts in accordance with this disclosure can occur in various orders and/or concurrently, and with other acts not presented and described herein. Furthermore, not all illustrated acts can be required to implement the method 400 in accordance with the disclosed subject matter. In addition, those skilled in the art will understand and appreciate that the method 400 could alternatively be represented as a series of interrelated states via a state diagram or events. Additionally, it should be appreciated that the method 400 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At operation 402, processing logic can identify a first video stream from a first client device of a first participant of a virtual meeting and a second video stream from a second client device of a second participant of the virtual meeting.

At operation 404, processing logic can determine a background layer and a foreground layer of a first frame of the first video stream, where the foreground layer of the first frame of the first video stream includes a rendering of the first participant.

In some embodiments, to determine the background layer and the foreground layer of the first frame of the first video stream, the processing logic can provide the first frame of the first video stream as input to a machine learning model. The machine learning model is trained to predict, based on a given frame, segmentation labels for the given frame that represent foreground and background regions of the given frame. The processing logic can obtain outputs from the machine learning model, where the outputs include one or more background regions and one or more foreground regions. The processing logic can combine the one or more background regions to obtain the background layer and combine the one or more foreground regions to obtain the foreground layer.

At operation 406, processing logic can determine a first eye position of the second participant within a first frame of the second video stream and a second eye position of the second participant within a second frame of the second video stream.

In some embodiments, to determine the first eye position of the second participant within the first frame of the second video stream and the second eye position of the second participant within the second frame of the second video stream the processing logic can provide the first frame and the second frame of the second video stream as input to a machine learning model. The machine learning is trained to predict, based on a given frame, one or more regions within the given frame that each represent eye features. The processing logic can obtain one or more outputs from the machine learning model. The one or more outputs include one or more regions within the first and the second frame of the second video stream, each indicating eye features within the respective frame. The processing logic can determine the first eye position and the second eye position based on the one or more regions indicating eye features within the respective frame. In some embodiments, to determine the first eye position and the second eye position, the processing logic can determine an average horizontal position, within the respective frame, of the one or more regions indicating eye features. In some embodiments, the first eye position and the second eye position are determined relative to a field of view (FOV) of a device capturing video signals associated with the second video stream.

At operation 408, processing logic can determine a presentation position of the background layer relative to the foreground layer for a second frame of the first video stream based on movement between the first eye position of the second participant within the first frame and the second eye position of the second participant within the second frame of the second video stream.

In some embodiments, to determine the presentation position of the background layer relative to a foreground layer for the second frame of the first video stream, the processing logic can determine a pixel difference between the first eye position of the second participant within the first frame of the second video stream and the second eye position of the second participant within the second frame of the second video stream. The processing logic can modify the presentation position of the background layer in a same direction as the movement between the first eye position and the second eye position. An amount of presentation position modification is proportional to the pixel difference between the first eye position and the second eye position. In some embodiments, the processing logic can scale the amount of presentation position modification according to a depth distance between the foreground layer and the background layer. In some embodiments, the depth distance is an assigned indicator of depth between the background layer and the foreground layer of the first video stream.

At operation 410, processing logic can provide, for display on the second client device, a user interface (UI) presenting the second frame of the first video stream reflecting the determined presentation position of the background layer relative to the foreground layer.

Figure 5:
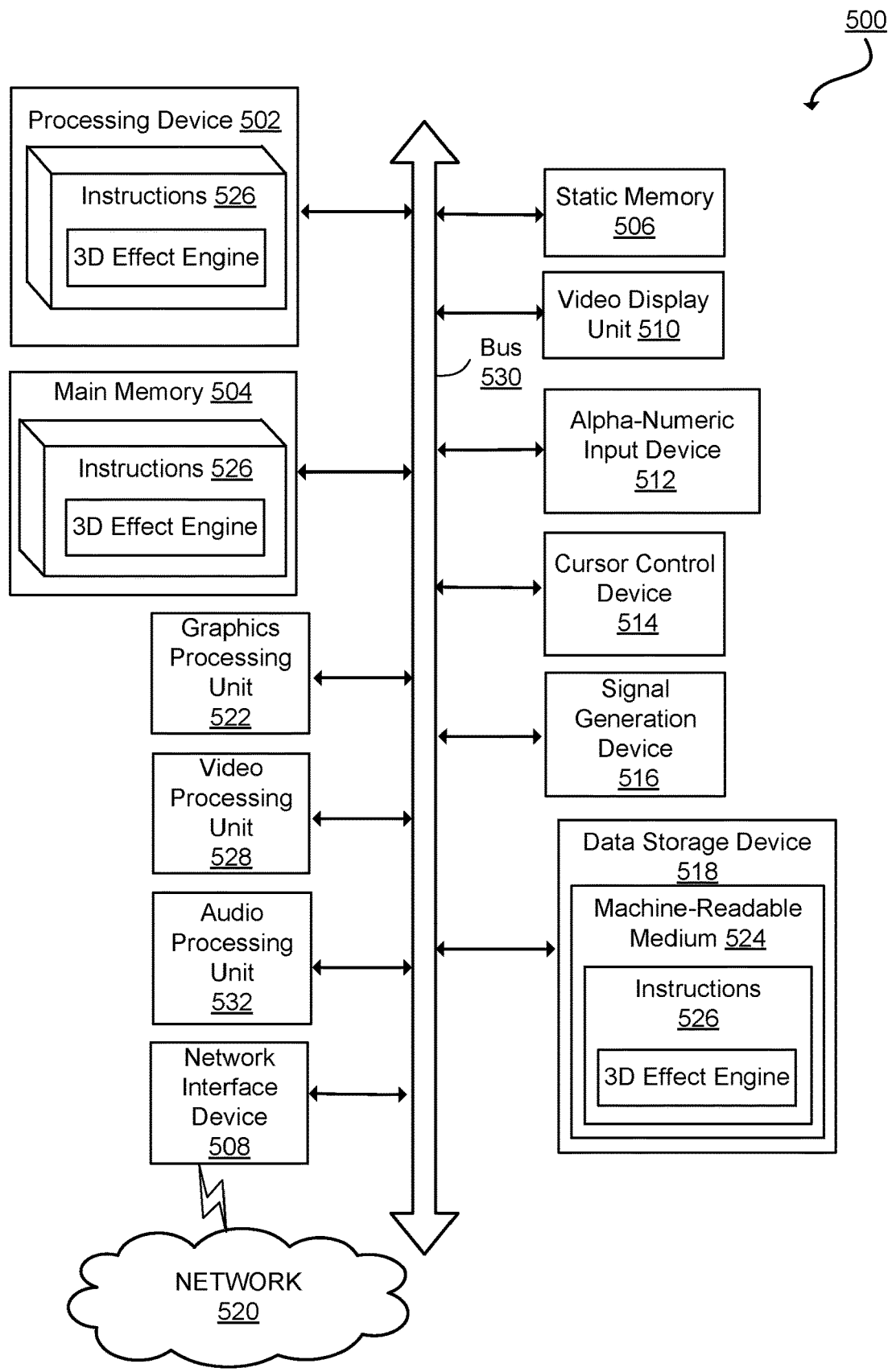
FIG. 5 illustrates an example machine of a computer system within which a set of instructions, for causing the machine to perform any one or more of the methodologies discussed herein, can be executed, in accordance with aspects and implementations of the present disclosure.

FIG. 5 illustrates an example machine of a computer system 500 within which a set of instructions, for causing the machine to perform any one or more of the methodologies discussed herein, can be executed, in accordance with aspects and implementations of the present disclosure. The computer system 500 can be servers 130-150 or client devices 102A-N of FIG. 1. In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random-access memory (DRAM) such as synchronous DRAM (SDRAM), a static memory 506 (e.g., flash memory, static random-access memory (SRAM), etc.), and a data storage device 518, which communicate with each other via a bus 530.

Processing device 502 represents one or more processors such as a microprocessor, a central processing unit, or the like. More particularly, the processing device can be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 can be configured to execute instructions 526 for performing the operations and steps described herein.

The computer system 500 can further include a network interface device 508 to communicate over the network 520. The computer system 500 also can include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 can include a machine-readable storage medium 524 (also known as a non-transitory computer-readable storage medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine, allowing the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm can be a sequence of operations leading to a desired result. The operations are those requiring physical manipulations of physical quantities. Such quantities can take the form of electrical or magnetic signals capable of being stored, combined, compared, and otherwise manipulated. Such signals can be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems can be used with programs in accordance with the teachings herein, or it can prove convenient to construct a more specialized apparatus to perform a similar sequence of procedures. In addition, the present disclosure is not described with reference to any particular programming language and any one in use in such computer systems can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications can be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer-readable medium; or a combination thereof.

The aforementioned systems, engines, modules, and so on have been described with respect to interact between several components and/or blocks. It can be appreciated that such systems, engines, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

The methods and illustrative examples described herein are not inherently related to any particular computer or other apparatus. Various general purpose systems can be used in accordance with the teachings described herein, or it can prove convenient to construct more specialized apparatus to perform method 400 and/or each of its individual functions, routines, subroutines, or operations. Examples of the structure for a variety of these systems are set forth in the description above. The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying a first video stream from a first client device of a first participant of a virtual meeting and a second video stream from a second client device of a second participant of the virtual meeting;
   determining a background layer and a foreground layer of a first frame of the first video stream, wherein the foreground layer of the first frame of the first video stream comprises an image of the first participant;
   determining a first position of at least one facial feature of the second participant within a first frame of the second video stream and a second position of the at least one facial feature of the second participant within a second frame of the second video stream;
   modifying the background layer, wherein modifying the background layer comprises reducing a size of the background layer at a side of the image of the first participant in the foreground layer for a second frame of the first video stream based on a difference between the first position of the at least one facial feature of the second participant within the first frame of the second video stream and the second position of the at least one facial feature of the second participant within the second frame of the second video stream; and providing, for display on the second client device, a user interface (UI) presenting the second frame of the first video stream, the second frame comprising the modified background layer.

2. The method of claim 1, wherein determining the first position of the at least one facial feature of the second participant within the first frame of the second video stream and the second position of the at least one facial feature of the second participant within the second frame of the second video stream comprises:

providing the first and the second frame of the second video stream as input to a machine learning model, wherein the machine learning model is trained to predict, based on a given frame, one or more regions within the given frame that each represent eye facial features;

obtaining one or more outputs from the machine learning model, wherein the one or more outputs comprise one or more regions within the first and the second frame of the second video stream, each indicating facial features within the respective frame; and determining the first position and the second position based on the one or more regions indicating facial features within the respective frame.

3. The method of claim 2, wherein determining the first position and the second position comprises determining an average horizontal position, within the respective frame, of the one or more regions indicating facial features.

4. The method of claim 1, wherein the first position and the second position are determined relative to a field of view (FOV) of a device capturing video signals associated with the second video stream.

5. The method of claim 1, wherein determining the background layer and the foreground layer of the first frame of the first video stream comprises:

providing the first frame of the first video stream as input to a machine learning model, wherein the machine learning model is trained to predict, based on a given frame, segmentation labels for the given frame that represent foreground and background regions of the given frame;

obtaining a plurality of outputs from the machine learning model, wherein the plurality of outputs comprises one or more background regions and one or more foreground regions; and combining the one or more background regions to obtain the background layer and combining the one or more foreground regions to obtain the foreground layer.

6. The method of claim 1, wherein modifying the background layer comprises:

determining a pixel difference between the first position of the at least one facial feature of the second participant within the first frame of the second video stream and the second position of the at least one facial feature of the second participant within the second frame of the second video stream; and reducing the size of the background layer proportional to the pixel difference between the first position and the second position.

7. The method of claim 6, wherein the reduced size of the background layer is scaled according to a depth distance between the foreground layer and the background layer.

8. The method of claim 7, wherein the depth distance is an assigned indicator of depth between the background layer and the foreground layer of the first video stream.

9. A system comprising:

a memory device; and a processing device coupled to the memory device, the processing device to perform operations comprising:

identifying a first video stream from a first client device of a first participant of a virtual meeting and a second video stream from a second client device of a second participant of the virtual meeting;

determining a background layer and a foreground layer of a first frame of the first video stream, wherein the foreground layer of the first frame of the first video stream comprises an image of the first participant;

determining a first position of at least one facial feature of the second participant within a first frame of the second video stream and a second position of the at least one facial feature of the second participant within a second frame of the second video stream;

modifying the background layer, wherein modifying the background layer comprises reducing a size of the background layer at a side of the image of the first participant in the foreground layer for a second frame of the first video stream based on a difference between the first position of the at least one facial feature of the second participant within the first frame of the second video stream and the second position of the at least one facial feature of the second participant within the second frame of the second video stream; and providing, for display on the second client device, a user interface (UI) presenting the second frame of the first video stream, the second frame comprising the modified background layer.

10. The system of claim 9, wherein determining the first position of the at least one facial feature of the second participant within the first frame of the second video stream and the second position of the at least one facial feature of the second participant within the second frame of the second video stream comprises:

providing the first and the second frame of the second video stream as input to a machine learning model, wherein the machine learning model is trained to predict, based on a given frame, one or more regions within the given frame that each represent facial features;

obtaining one or more outputs from the machine learning model, wherein the one or more outputs comprise one or more regions within the first and the second frame of the second video stream, each indicating facial features within the respective frame; and determining the first position and the second position based on the one or more regions indicating facial features within the respective frame.

11. The system of claim 10, wherein determining the first position and the second position comprises determining an average horizontal position, within the respective frame, of the one or more regions indicating facial features.

12. The system of claim 9, wherein the first position and the second position are determined relative to a field of view (FOV) of a device capturing video signals associated with the second video stream.

13. The system of claim 9, wherein determining the background layer and the foreground layer of the first frame of the first video stream comprises:

provides the first frame of the first video stream as input to a machine learning model, wherein the machine learning model is trained to predict, based on a given frame, segmentation labels for the given frame that represent foreground and background regions of the given frame;

obtaining a plurality of outputs from the machine learning model, wherein the plurality of outputs comprises one or more background regions and one or more foreground regions; and combining the one or more background regions to obtain the background layer and combining the one or more foreground regions to obtain the foreground layer.

14. The system of claim 9, wherein modifying the background layer comprises:

determining a pixel difference between the first position of the at least one facial feature of the second participant within the first frame of the second video stream and the second position of the at least one facial feature of the second participant within the second frame of the second video stream; and reducing the size of the background layer proportional to the pixel difference between the first position and the second position.

15. The system of claim 14, wherein the reduced size of the background layer is scaled according to a depth distance between the foreground layer and the background layer.

16. The system of claim 15, wherein the depth distance is an assigned indicator of depth between the background layer and the foreground layer of the first video stream.

17. A non-transitory computer-readable storage medium comprising instructions for a server that, when executed by a processing device, cause the processing device to perform operations comprising:

identifying a first video stream from a first client device of a first participant of a virtual meeting and a second video stream from a second client device of a second participant of the virtual meeting;

determining a background layer and a foreground layer of a first frame of the first video stream, wherein the foreground layer of the first frame of the first video stream comprises an image of the first participant;

determining a first position of at least one facial feature of the second participant within a first frame of the second video stream and a second position of the at least one facial feature of the second participant within a second frame of the second video stream;

modifying the background layer, wherein modifying the background layer comprises reducing a size of the background layer at a side of the image of the first participant in the foreground layer for a second frame of the first video stream based on a difference between the first position of the at least one facial feature of the second participant within the first frame of the second video stream and the second position of the at least one facial feature of the second participant within the second frame of the second video stream; and providing, for display on the second client device, a user interface (UI) presenting the second frame of the first video stream, the second frame comprising the modified background layer.

18. The non-transitory computer-readable storage medium of claim 17, wherein determining the first position of the at least one facial feature of the second participant within the first frame of the second video stream and the second position of the at least one facial feature of the second participant within the second frame of the second video stream comprises:

providing the first and the second frame of the second video stream as input to a machine learning model, wherein the machine learning model is trained to predict, based on a given frame, one or more regions within the given frame that each represent facial features;

obtaining one or more outputs from the machine learning model, wherein the one or more outputs comprise one or more regions within the first and the second frame of the second video stream, each indicating facial features within the respective frame; and determining the first position and the second position based on the one or more regions indicating facial features within the respective frame.

19. The non-transitory computer-readable storage medium of claim 18, wherein determining the first position and the second position comprises determining an average horizontal position, within the respective frame, of the one or more regions indicating facial features.

20. The non-transitory computer-readable storage medium of claim 17, wherein the first position and the second position are determined relative to a field of view (FOV) of a device capturing video signals associated with the second video stream.

\* \* \* \* \*